Patented June 14, 1932

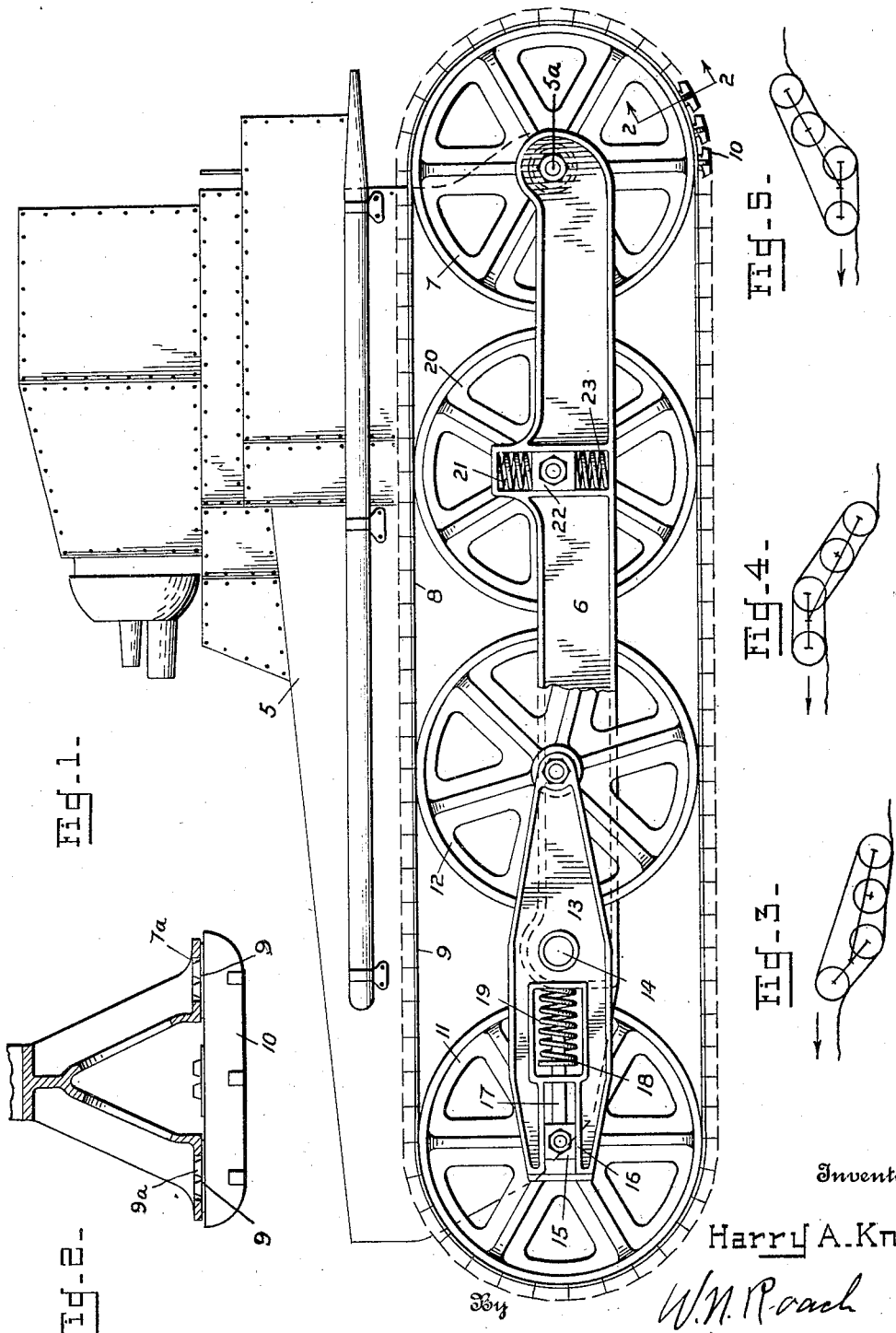

1,862,934

UNITED STATES PATENT OFFICE

HARRY A. KNOX, OF DAVENPORT, IOWA

SUSPENSION FOR TRACKLAYING VEHICLES

Application filed March 1, 1928. Serial No. 258,325.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

The subject of this invention is a suspension for track laying vehicles.

The principal object of the invention is to provide a suspension for track laying vehicles which will afford a large area of ground contact in passing over obstacles and irregularities and which will relieve the shock on the forward portion of the vehicle when, in plunging, it strikes the ground.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a view in side elevation of a vehicle equipped with the improved suspension;

Fig. 2 is a sectional view on the line 2—2 of Fig. 1; and

Figs. 3 to 5 are diagrammatic views illustrating the action of the suspension.

Referring to the drawing by numerals of reference:

There is shown a vehicle 5 having a box-like hull or body. On each side of the body and spaced therefrom is a side rail 6 disposed opposite and parallel to the lower portion of the body and cooperating with the body to provide a main frame within which the supporting wheels are to be mounted. The side rail is hung from the driving axle 5a at the rear of the body and from a pin 14 near the forward end of the body.

The rear wheel 7 on the driving axle 5a constitutes the drive sprocket for an endless traction belt 8 which as shown in Fig. 2 is of the jointless type, consisting of spaced metallic bands 9—9—9 to which are secured transverse grousers 10. The wheel 7 may be of any suitable form but, as herein shown, it is provided with spaced recesses 7a for the reception of lugs 9a of the track.

The two forward wheels 11 and 12 of the track-laying unit are mounted within and at the extremities of an auxiliary frame 13 consisting of spaced plates, only one of which is shown. The auxiliary frame is mounted centrally on the pin 14. The journal blocks 15 of the foremost wheel 11 are disposed in longitudinal guide ways 16 in the side members of the frame 13 and they are each provided with a rearwardly extending guide rod 17 having a seat 18 for a helical spring 19 confined within the frame. By this means the forward wheel serves to maintain the band track 8 under a predetermined tension in addition to serving as a relief when the overall length of the track is decreased by reason of passing over an obstruction or by reason of accumulations of dirt gathering in front of the sprocket on the ground reach of the track.

Any wheel support 20 which may be positioned intermediate the rear sprocket and the front oscillatory group is preferably mounted for vertical movement, and a resilient cushion 21 is interposed between the top and bottom of the journal box 22 and the supporting brackets 23 on the body 5 and side rails 6.

In Figs. 3 to 5 the operation of the suspension is diagrammatically illustrated. When an obstruction is encountered the foremost wheel of the oscillatory group is free to be moved angularly upward to follow the obstruction, this movement swinging the auxiliary frame about its pivot and causing either downward pressure or downward movement of the rear wheel of the group. Under such a condition a ground contact will obtain over a major portion of the track.

As the vehicle approaches the crest of an obstacle the front group of wheels will be inclined to follow the contour of the ground.

On the descent, whether it be plunging or gradual, the front group by reason of its freedom of movement will diminish the shock and reduce the tendency of the foremost wheel to bury its nose in the ground.

I claim:

1. A track laying unit for vehicles embodying a main frame, a drive wheel carried thereby, a centrally pivoted auxiliary frame at the forward end of the main frame, a wheel on each end of the auxiliary frame, an endless band track encircling the wheels, means for urging the front wheel forwardly to maintain the band track under tension, a vertically movable wheel supported intermediate the drive wheel and the rear wheel on the auxiliary frame and all of said wheels being of uniform size.

2. A track laying unit for vehicles embodying a main frame, a drive wheel carried thereby, a centrally pivoted auxiliary frame at the forward end of the main frame, a wheel on each end of the auxiliary frame, an endless band track encircling the wheels, means for urging the front wheel forwardly to maintain the band track under tension and all of said wheels being of uniform size.

3. In a vehicle, a load member to be supported, a track laying unit on each side of the load member including a track driving wheel carried by the load member at one end, an oscillatory member carried by the load member at the other end, wheels on the oscillatory member on opposite sides of its center of oscillation, a yieldingly mounted wheel between the driving wheel and the oscillatory member, and an endless track passing around the wheels.

HARRY A. KNOX.